United States Patent [19]

Murphy

[11] 4,350,474
[45] Sep. 21, 1982

[54] TIDE FOLLOWING WAVE POWER MACHINE

[76] Inventor: James T. Murphy, 6232 Caminito Araya, La Jolla, Calif. 92122

[21] Appl. No.: 174,365

[22] Filed: Aug. 1, 1980

[51] Int. Cl.³ ............................................. F03B 9/00
[52] U.S. Cl. ........................................ 416/7; 416/1; 415/5
[58] Field of Search ............... 417/320, 330, 333, 334; 416/7, 8, 23, 24.1; 415/5

[56] References Cited

U.S. PATENT DOCUMENTS

| | | | |
|---|---|---|---|
| 932,278 | 8/1909 | Hicks | 417/330 |
| 981,514 | 1/1911 | Ames | 417/334 X |
| 1,043,732 | 11/1912 | Runyan | 417/330 |
| 1,112,352 | 9/1914 | Booth | 417/334 X |
| 1,385,738 | 7/1921 | Whittle | 417/330 |
| 1,608,373 | 11/1926 | Dell | 416/8 |
| 1,887,316 | 11/1932 | Lockfaw | 417/330 |
| 3,983,404 | 9/1976 | Sherrard | 417/330 X |
| 4,049,300 | 9/1977 | Schneider | 416/7 X |

FOREIGN PATENT DOCUMENTS 543508 9/1922 France.
1172424 2/1959 France.

Primary Examiner—Everette A. Powell, Jr.
Attorney, Agent, or Firm—George J. Rubens

[57] ABSTRACT

At least two spaced piers are constructed on a suitable tidal beach extending from the shore into the water a predetermined distance to meet the first breaking waves at low tide. A carriage is movably supported on the piers on an inclined path; the carriage having a frame supporting a pair of spaced sprocket wheels on each end over which is passed an endless belt. The ends of a plurality of blades are secured to the chain in spaced relation completely thereabout. Each sprocket wheels closest to shore is connected to a gear train for transmitting the torque generated by the wave action to a power belt extending along each pier to a transducer located at the shore end of the pier. Means are provided for moving the carriage on the pier on an inclined path in and out from the shore to meet the level of the changing tide so as to continuously generate power throughout the tidal wave.

5 Claims, 3 Drawing Figures

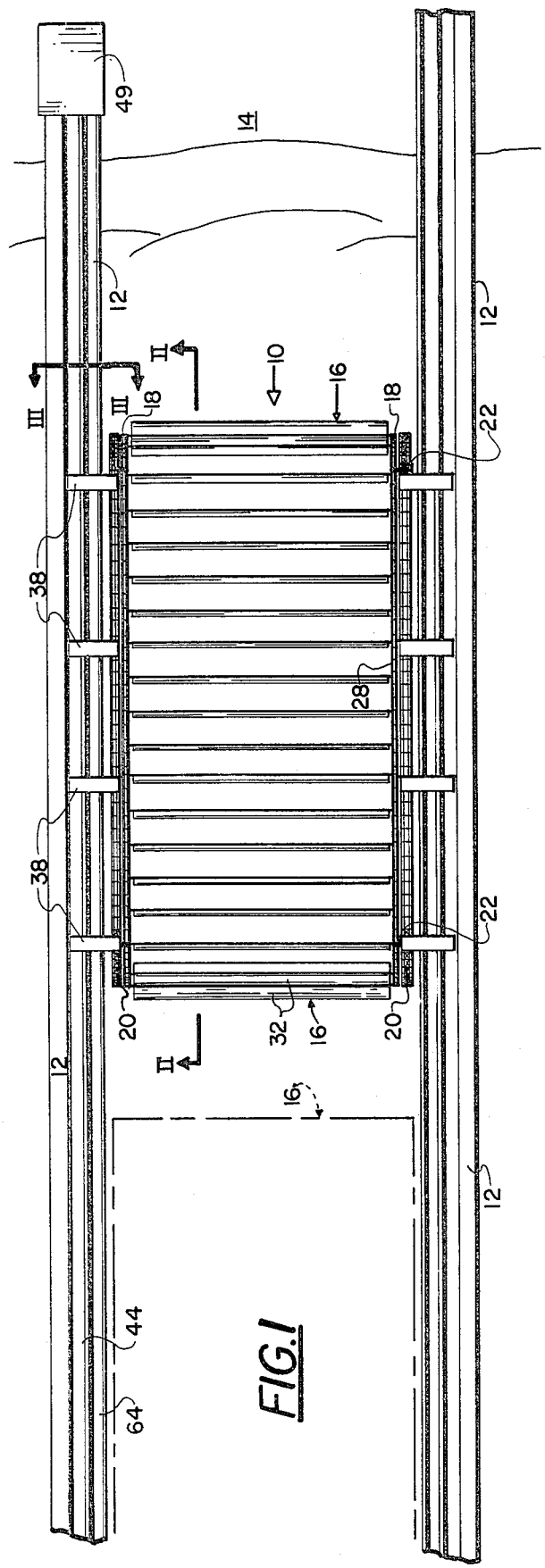
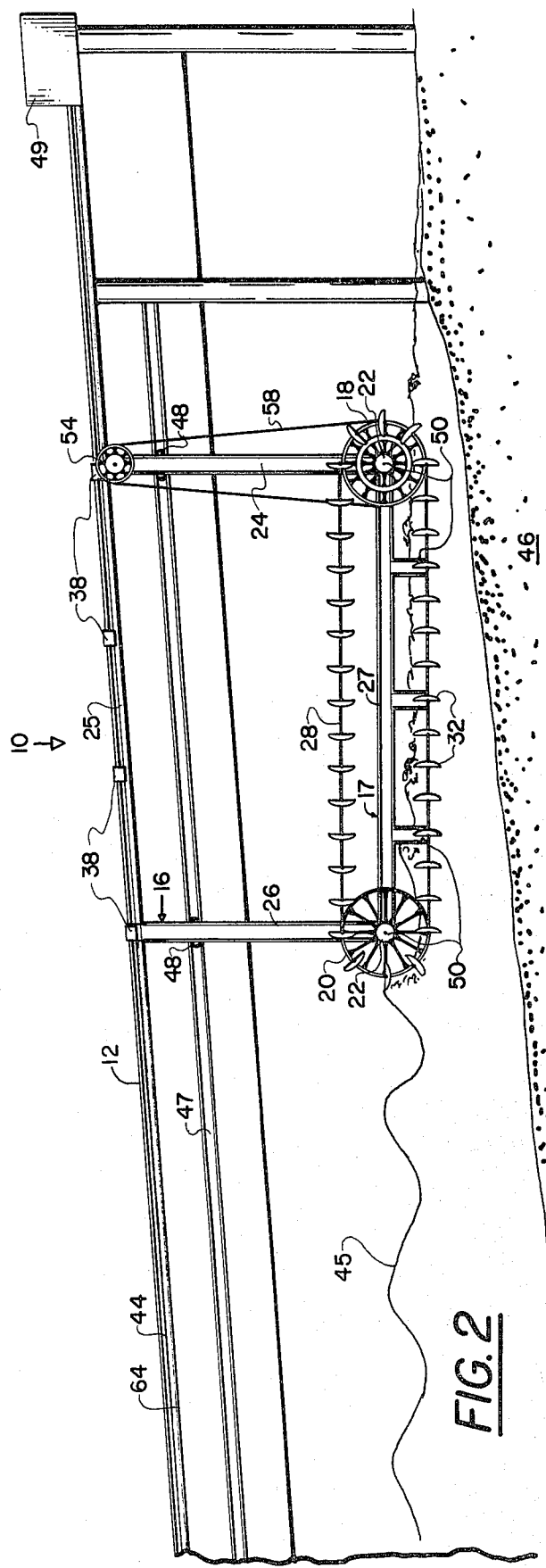

TIDE FOLLOWING WAVE POWER MACHINE

BACKGROUND OF THE INVENTION

This invention relates to wave power machines, and more particularly to such a machine that follows the incoming and outgoing tides to continuously convert wave energy into useful power, such as electricity.

The concept of utilizing wave energy to generate electrical power has been long established and numerous devices have been conceived to accomplish this purpose. Nevertheless, in the past, these machines have not been considered practical because of the abundance of inexpensive fossil fuels.

However, the cost of fossil fuels within the past several years has increased many fold and its availability doubtful, making it imperative that alternate power sources be obtained that are cheaper and readily available.

Accordingly, a renewed interest in wave power machines has arisen because the technology satisfies the requirements of cost and availability. The prior art wave power machines, as can be exemplified by U.S. Pat. No. 3,504,985, usually provide a plurality of vertical pilings driven into the ocean bottom. A frame having rotatable sprockets over which are driven an endless belt carrying blades or buckets is supported between the pilings. Means are provided for raising and lowering the frame vertically with respect to the pilings to adjust for the level of the tidal water. As clearly indicated in this prior art patent, the endless belts are driven intermittently requiring a flywheel arrangement to smooth out the power generated. It is apparent that such prior art machines utilize only a relatively short portion of the beach depth that is subject to the tidal action.

The novel machine of the present invention produces a continuous source of energy by moving the carriage, having the wave engaging blades, to follow the tide, moving relatively horizontally on the piers in and out from the beach to traverse a substantially long depth of the beach. Means are provided to position the carriage so that the outermost sprocket wheels position and maintain the blades in the first breaking waves throughout the tidal action. Thus, energy is generated continuously through the tidal action to achieve greater efficiency than the prior art machines.

OBJECTS OF THE INVENTION

A principal object of this invention is to provide a wave power machine that is more efficient in generating power.

Another important object is to provide a wave power machine that operates continuously throughout the tidal action.

Still another object is to provide a movable carriage for such a wave power machine that can be smaller in length.

IN THE DRAWING

FIG. 1 is a top plan view of the novel wave power machine installed on a suitable beach showing the movable carriage at high tide and low tide positions.

FIG. 2 is a cross section of the carriage taken along line II—II of FIG. 1.

DESCRIPTION OF THE PREFERRED EMBODIMENT

Figure 3:
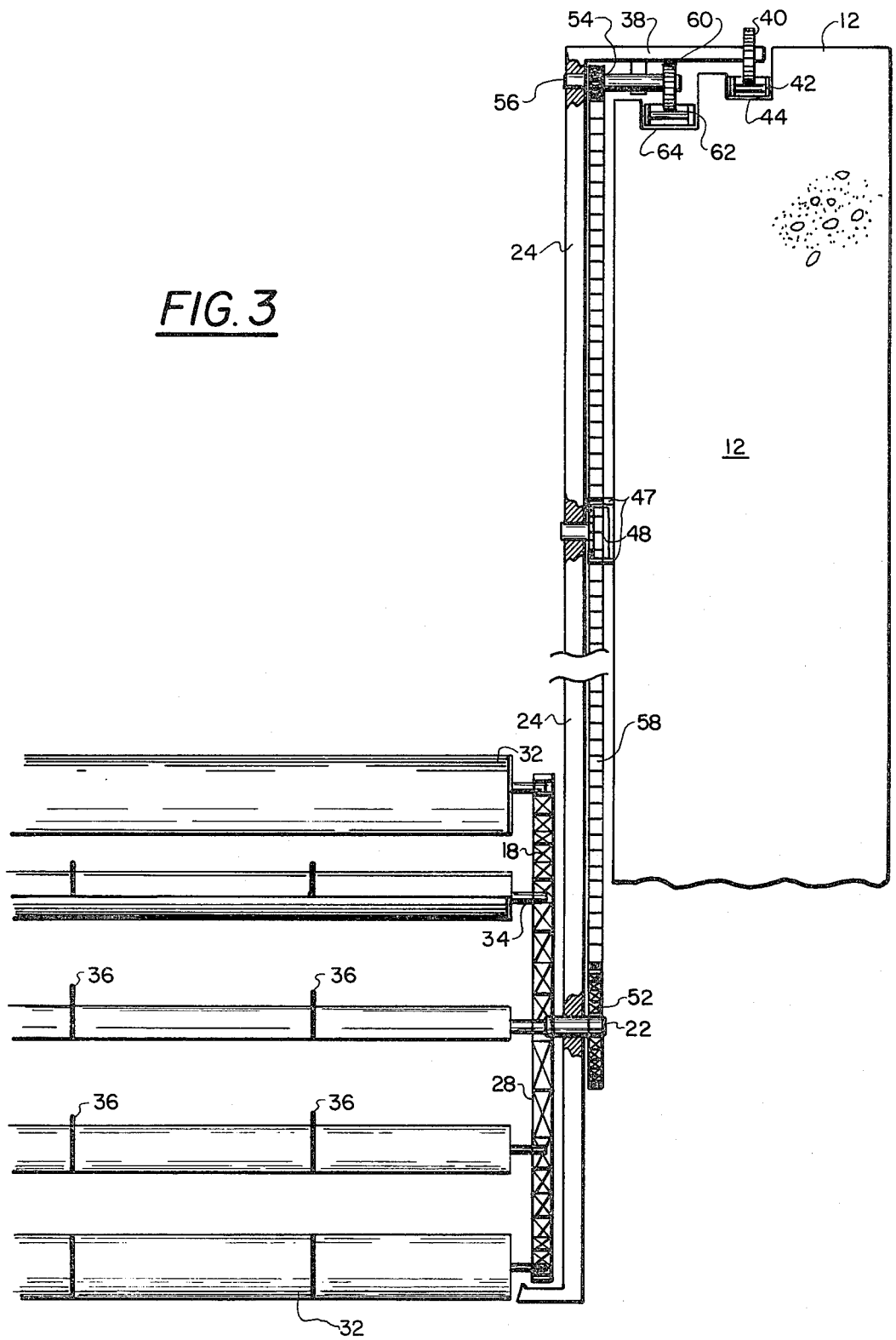
FIG. 3 is an enlarged end view of one end of the carriage and respective pier taken along line III—III of FIG. 1, showing the driving train and pier structure.

Referring to the drawing where like reference numerals refer to similar parts throughout the figures, there is shown in FIG. 1 a top plan view of the invention power wave machine 10 installed on a suitable tidal beach having the desired characteristics, namely, a long, gentle and gradual slope conducive to producing a well-defined breaking wave action throughout the tidal action.

The novel machine 10 comprises at least two spaced-apart concrete piers 12 which extend from the shore 14, or adjacent thereto, into the water, usually, but not necessarily, substantially perpendicular thereto.

In a preferred embodiment, and without any intent to limit the invention, it is desirable that the piers extend in length from 400 to 500 feet, and be spaced apart a distance of 50 to 75 feet.

A carriage 16 is supported on and between piers 12, and movably mounted for travel thereon toward and away from the water a distance substantially the length of the pier, in a manner to be described. Carriage 16 comprises a rigid frame 17 which supports a treadmill construction including a pair of spaced front, or beach side, sprocket wheels 18 and a pair of rear, or ocean side, sprocket wheels 20. Again, by way of illustration, the sprocket wheels can be approximately 10 feet in diameter, and longitudinally spaced apart on frame 17 from 100 to 150 feet. Sprocket wheels 18 and 20 on each side of carriage 16 are journelled on axles 22 (see FIGS. 2 and 3) to front and rear vertical stanchion 24 and 26, respectively. Front stanchions 24 are longer than rear stanchions 26 for a purpose to be described. Upper and lower horizontal frame members 25 and 27 complete the frame assembly 17.

As best illustrated in FIGS. 1 and 2, an endless link chain 28 extends around each pair of sprocket wheels 18 and 20. A plurality of concave wave-engaging blades or buckets 32 are anchored at each end 34 to a link of the respective chain entirely around its periphery, being spaced apart on the chain about 3 feet. The blades may be about 2 feet high, with a concavity of about 6 inches. As the blades extend substantially the transverse distance between the piers, a plurality of baffle plates 36 are welded or otherwise secured transversely the blades within the concavity, being spaced apart about 4 to 5 feet, to add rigidity to the blades, and to confine the lateral thrust of the waves.

As best illustrated in all the figures, each upper horizontal frame member has welded thereto a plurality of spaced laterally extending bracket 38 extending partially over the respective pier on which end is journelled a gear 40 engaging a chain belt 42 slidably supported longitudinally on a shoulder 44 recessed in the respective piers substantially their length. In lieu of the concrete pier 12 and recessed shoulder 44, it is obvious that the pier can be constructed of pilings (not shown) on which are supported railings (not shown).

Shoulders 44 are oriented on their respective piers on an inclined plane substantially parallel to the ocean floor 46 so that the endless belt assembly, which is horizontally supported on carriage 16, will move horizontally to the water level.

Both sets of stanchions can be supported laterally during carriage movement by a longitudinal channel member 47 secured on the inside wall of each pier to receive slidably a captured wheel 48 journelled to each stanchion at an intermediate position. Channel 47 is oriented on each pier to have the identical incline as shoulders 44.

Chain belt 42 is driven longitudinally toward and away from the beach to position the carriage to follow the tide by a suitable drive motor 49 located at the base of each pier or on shore.

At low tide, carriage 16 is initially positioned by chain belt 42 (see broken line position in FIG. 1) so that the first breaking waves engage rear sprocket wheels 20 at a point below their axles so as to strike the open concave face of blades 32 as they move counterclockwise around wheels 20. The breaking wave action moving toward the beach successively engage the remaining blades on the lower legs of the endless belts. It should be noted that the upper leg of each belt 28 as it returns the blades to rear wheels 20 extends above the water level to reduce water resistance.

Carriage 20 is then gradually moved toward the beach following the breaking waves as the tide moves in, and the carriage is moved away from the beach in the same manner as the tide recedes. This movement of carriage 16 by chain belt 42 can be controlled manually by an operator at a shore station, or automatically by means of a pair of water sensors 50 suitably spaced vertically on frame 17 so as to maintain the water level of the tide therebetween.

As best seen in FIG. 3, the force of the tidal waves on blades 32 throughout the movement of the carriage incoming and outgoing tide is transmitted by front sprocket wheels through a lower driving gear 52, also mounted on each front wheel axle 22, an upper driven gear 54 mounted on a shaft 56 supported by the upper end of each front stanchions 24 and bracket 38, and an interconnecting vertical endless driving chain 56. Shaft 58 terminates in a gear 60 connected to a power chain 62 movably supported on a second shoulder 64 formed on pier 12, innermost and below pier shoulder 44. Power chain 62 drives a suitable generator or the like, not shown, mounted on the shore or pier end. By locating the drive gears on the front sprocket wheels 18, the length of the power chain can be reduced by the length of carriage 16.

The invention wave power machine is designed to convert tidal energy into a suitable power source in an efficient and continuous process by following the incoming and outgoing tides.

I claim:

1. A wave power machine for utilizing the force of breaking waves on a tidal body of water having a beach area comprising:
    at least two spaced apart piers extending from the beach into the water a predetermined distance;
    a carriage supported on and between said piers and horizontally movable in parallel relation to the level of said water, said carriage having two pairs of spaced wheels rotatably supporting a pair of respective horizontally extending looped endless belts;
    a plurality of wave-engaging spaced blades supported at each end on said endless belts and extending between and perpendicular to said piers; the blades on the lower side of the endless belts successionally engaging the breaking waves;
    means for supporting the carriage on said piers for longitudinally inclined movement with respect to said water; and
    means for controlling the position of the carriage into and away from the beach to follow the incoming and outgoing tides, respectively, to enable the blades to contact the initial breaking waves and utilize their force throughout the entire extent of the wave action.

2. The machine of claim 1, wherein said blades are rigid and concave to face the waves, each of said blades being made of a unitary member and containing a plurality of longitudinally spaced, transverse baffle plates secured in the concavity of the blades.

3. The machine of claim 1 wherein said endless belts have a length sufficient for the blades to engage simultaneously a plurality of breaking waves.

4. The machine of claim 1 wherein said endless belts are at least 100 feet in length.

5. A method of converting the power of a series of breaking waves on a tidal beach throughout the incoming and outgoing tides comprising the steps of:
    selecting a beach having a long, moderately inclined ocean floor that produces a substantially long surf action throughout the tidal action;
    moving a wave transducer in and away from the beach horizontally along an inclined path to follow the incoming and outgoing tides, respectively and:
    positioning the transducer to utilize simultaneously the force of a plurality of breaking waves maximizing the power generated.

* * * * *